(12) United States Patent
Sato et al.

(10) Patent No.: US 6,222,348 B1
(45) Date of Patent: Apr. 24, 2001

(54) BATTERY SYSTEM FEATURING TRANSMISSION OF BATTERY DATA FROM A BATTERY PACK

(75) Inventors: Hideyuki Sato; Shuji Okegawa, both of Chiba; Hiroyuki Arakawa, Tochigi; Yoshinari Higuchi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/504,442

(22) Filed: Feb. 16, 2000

Related U.S. Application Data

(63) Continuation of application No. 09/247,431, filed on Feb. 10, 1999, now abandoned.

(30) Foreign Application Priority Data

Feb. 13, 1998 (JP) .................................................. 10-031621

(51) Int. Cl.⁷ .................................................. H01M 10/46
(52) U.S. Cl. .............................................................. 320/149
(58) Field of Search .................................... 320/112, 132, 320/149, DIG. 18, DIG. 21, FOR 147, FOR 142

(56) References Cited

U.S. PATENT DOCUMENTS

| 5,315,287 | 5/1994 | Sol . |
| 5,541,489 | 7/1996 | Dunstan . |
| 5,598,087 | 1/1997 | Hara . |
| 5,600,566 | 2/1997 | Park . |
| 5,606,243 | 2/1997 | Sakai et al. . |
| 5,699,050 | 12/1997 | Kanazawa . |
| 5,786,640 | 7/1998 | Sakai et al. . |
| 5,883,497 | 3/1999 | Turnbull . |

FOREIGN PATENT DOCUMENTS

| 0 750 215 A2 | 12/1996 | (EP) . |
| 0 794 438 A2 | 9/1997 | (EP) . |

*Primary Examiner*—Edward H. Tso
(74) *Attorney, Agent, or Firm*—Frommer Lawrence & Haug, LLP.; William S. Frommer; Bruno Polito

(57) ABSTRACT

Necessary information is obtained without connecting a signal line between an electronic device and a charging device, so that it becomes possible to provide a highly value-added function without deteriorating convenience and portability of the charging device and the electronic device.

13 Claims, 9 Drawing Sheets

BATTERY SYSTEM FEATURING TRANSMISSION OF BATTERY DATA FROM A BATTERY PACK

This application is a continuation of U.S. Ser. No. 09/247,431 filed Feb. 10, 1999, now abandoned.

BACKGROUND OF THE INVENTION

1. Field of the Invention

The present invention relates to a battery pack and a battery system using this battery pack.

2. Description of the Related Art

The present applicant has previously proposed a charging device which is, upon charging a battery pack, capable of indicating a drive possible time of an electronic device using a battery cell being charged and its current charging capacity as shown in FIGS. 1 to 4.

This charging device will be described. In FIG. 1, reference numeral 1 denotes a charging device housed in an electronic device such as a video tape recorder having a built-in camera (hereinafter referred to as a video camera) or the like. Also, in FIG. 1, reference numeral 2 denotes an AC adapter 2 connected to a commercially-available power supply to supply the power to the video camera and the charging device 1.

This charging device 1 includes a charging circuit 3, a calculation processing microcomputer 5 and a display device 6 and this charging circuit 3 charges a battery cell 20 (see FIG. 2) of a battery pack 4 that is used to drive the video camera when a user carries the video camera. The charging circuit 3 is arranged as is well known in the prior art. This battery pack 4 includes at least a battery calculation processing means 4a for obtaining battery cell voltage detection information and charging current cumulated amount information and an a communication processing means 4b for communicating each of the information.

An example of this battery pack 4 is shown in FIG. 2. Referring to FIG. 2, a positive electrode of the battery cell 20 of the battery pack 4 is connected to a plus terminal TM1 of this battery pack 4, and a negative electrode of the battery cell 20 is connected through a current detection resistor R7 to a minus terminal TM2 of this battery pack 4. The plus terminal TM1 and the minus terminal TM2 are respectively connected to a plus terminal and a minus terminal at the output side of the charging circuit 3 of the charging device 1.

The power from a microcomputer power supply 16 including a series regulator, a reset circuit or the like is supplied to a microcomputer 10 housed in the battery pack 4. The microcomputer 10 is operated by the power supplied from this microcomputer power supply 16. By the way, the microcomputer 10 has functions of the battery calculation processing means 4a and communication processing means 4b. A charging current detection input terminal D11 of this microcomputer 10 is connected to an output terminal of an operational amplifier 13 provided to detect a charging current. A discharging current detection input terminal D12 thereof is connected to an output terminal of an operational amplifier 14 provided to detect a discharging current. Both the operational amplifiers 13 and 14 detect charging and discharging currents based on the voltage difference across the current detecting resistor 7.

An interrupt input terminal of the microcomputer 10 is connected to an output terminal of a 2-input NAND gate 15 having two input terminals connected to the respective output terminals of the operational amplifiers 13 and 14. Further, the output terminal of the 2-input NAND gate 15 is connected through a pull-up resistor R8, for example, to a power supply terminal. Also, a temperature detection input terminal of the microcomputer 10 is connected to an output terminal of a temperature sensor 19 which detects an ambient temperature of the battery cell 20. A voltage detection input terminal thereof is connected to an output terminal of a voltage detection circuit 18 which is used to detect a terminal voltage of the battery cell 20. A ground terminal GND thereof is connected to the negative electrode of the battery cell 20. An output and input terminal TMC used to communicate with the calculation processing microcomputer 5, which comprises a computation means of the charging device 1 of the video camera as will be described later on, is connected to buffer amplifiers 11 and 12.

Incidentally, analog input terminals such as the charging current detection input terminal D11, the discharging current detection input terminal D12, the temperature detection input terminal, the voltage detection input terminal and so on are all A/D input ports. Therefore, the microcomputer 10 houses an A/D converter for converting these analog input into digital form.

The voltage detection circuit 18 is formed of a voltage-dividing resistor comprising resistors R9 and R10. A voltage across the battery cell 20 is detected by this voltage-dividing resistor. A voltage detection value from this voltage detection circuit 18 is supplied to the voltage detection input terminal of the microcomputer 10. Accordingly, the microcomputer 10 is able to learn the terminal voltage across the battery cell 20 based on the voltage detection value supplied to this voltage detection input terminal from the voltage detection circuit 18.

Also, the temperature sensor 19 is comprised of a suitable device such as a temperature detection thermistor or the like. The temperature sensor 19 is disposed in the vicinity of or in contact with the battery cell 20, and a temperature detection value of this temperature sensor 19 is supplied to the temperature detection input terminal of the microcomputer 10. Accordingly, the microcomputer 10 is able to learn a temperature of the battery cell 20 based on the temperature detection value supplied to this temperature detection input terminal.

Then, a non-inverting input terminal of the operational amplifier 13 is connected through a resistor R3 to the negative electrode of the battery cell 20, and an inverting input terminal thereof is connected through a current voltage detection resister R7 to the negative electrode of the battery cell 20 and also to an amplification factor setting negative feedback resistor R2 and a resistor R1. Accordingly, the operational amplifier 13 outputs from its output terminal a voltage value which results from amplifying a current value (current value flowing upon charging) flowing into the battery pack 4 in response to a ratio (R2/R1) of resistance values of the resistors R1 and R2.

On the other hand, a non-inverting input terminal of the operational amplifier 14 is connected through a resistor R6 and the current voltage detection resistor R7 to the negative electrode of the battery cell 20. An inverting input terminal thereof is connected to a negative feedback resistor R5 and a resistor R4. Accordingly, the operational amplifier 14 outputs from its output terminal a voltage value which results from amplifying a current value (current value flowing upon discharging) flowing into the battery pack 4 in response to a ratio (R5/R4) of resistance values of the resistors R4 and R5.

A transistor switch Tr1 is comprised of a field-effect transistor, for example, and whose gate is connected to a switching control output terminal SW1 of the microcomputer 10. The resistor R1 is connected between the drain and the source of this transistor switch Tr1. Accordingly, when the level of the signal from the switching control output terminal SW1 of the microcomputer 10 goes to a high (H) level, for example, the transistor switch Tr1 is turned ON, whereby the resistance value based on this resistor R1 becomes approximately 0 (there is only the internal resistor of the transistor switch Tr1), thereby resulting in the amplification factor (amplifier gain) of the operational amplifier 13 whose amplification factor is set in response to the ratio (R2/R1) of the resistance values of the resistors R1 and R2 being increased.

On the other hand, when the level of the signal from the switching control output terminal SW1 of the microcomputer 10 goes to a low (L) level, for example, the transistor switch Tr1 is turned OFF, whereby the amplification factor of this operational amplifier 13 becomes such one corresponding to the ratio (R2/R1) of the resistance values of the resistors R1 and R2, i.e. amplification factor (amplifier gain) smaller than that obtained when the transistor switch Tr1 is placed in the ON state. Similarly, a transistor switch Tr2 is comprised of a field-effect transistor, for example, and whose gate is connected to a switching control output terminal SW2 of the microcomputer 10. The resistor R4 is connected between the drain and the source of the transistor switch Tr2.

Accordingly, when the level of the signal from the switching control output terminal SW2 of the microcomputer 10 goes to a high (H) level, for example, the transistor switch Tr2 is turned ON, thereby resulting in a resistance value of the resistor R4 being decreased to approximately 0 (there is only the internal resistance of the transistor switch Tr2). Thus, the amplification factor (amplifier gain) of the operational amplifier 14 increases. On the other hand, when the level of the signal from the switching control output terminal SW2 of the microcomputer 10 goes to a low (L) level, for example, the transistor switch Tr2 is turned OFF, thereby resulting in the amplification factor (amplifier gain) of the operational amplifier 14 being decreased.

The microcomputer 10 constantly monitors the levels of the charging current detection input terminal D11 and the discharging current detection input terminal D12 in the normal operation mode (Run mode). When the levels of these terminals D11, D12 are higher than the constant level, the microcomputer 10 causes the signal levels of the switching control output terminals SW1 and SW2 to be held at low level. Thus, the transistor switches Tr1 and Tr2 are both turned OFF, thereby resulting in the amplifier gains of the operational amplifiers 13 and 14 being decreased. Therefore, the microcomputer 10 in the normal operation mode (Run mode) becomes able to measure a current value (current value flowing in the charging or current value flowing in the discharging) flowing into the battery pack 4 by using the output values obtained from the operational amplifiers 13 and 14 whose amplifier gains are decreased. Accordingly, if the current values in the charging and the discharging are obtained, then it becomes possible to calculate the charging and discharging current cumulated value.

Also, in the above-mentioned example, data of a battery cell voltage V, a charging current I, a charging current cumulated amount Q and temperature dependence coefficients h1(T) and h2(T) from the battery pack 4 are supplied to the calculation processing microcomputer 5 comprising the computing means of this charging device 1.

Also, data of a power consumption W of a video camera using this battery pack 4 is supplied to this calculation processing microcomputer 5.

This calculation processing microcomputer 5 is operated in accordance with a flowchart shown in FIG. 4. This calculation processing microcomputer 5 computes the charging capacity of the battery cell 20 of the charged battery pack 4 being charged and displays a computed charging capacity on the display device 6 which will be described later on. At that same time, this calculation processing microcomputer 5 computes a time during which the present charging capacity can run the video camera using this battery pack 4, and displays this computed time on the display device 6.

[0020]

This display device 6 includes a present charging capacity indicator 30 comprising 5-step indicators a, b, c, d, e as shown in FIG. 3. The uppermost portion in the indicator upon charging is blinked. When the charging capacity ranges from 0 to 20%, for example, the indicator a is blinked; when the charging capacity ranges from 20 to 40%, the indicator a is lit and at the same time, the indicator b is blinked; when the charging capacity ranges from 40 to 60%, the indicators a and b are lit and at the same time, the indicator c is blinked; when the charging capacity ranges from 60 to 80%, the indicators a, b, c are lit and at the same time, the indicator d is blinked; when the charging capacity ranges from 80 to 100%, the indicators a, b, c, d are lit and at the same time, the indicator e is blinked; and when the charging capacity is greater than 100%, the indicators a, b, c, d, e are all lit.

Also, in the present charging capacity of the display device 6, as a running possible time indicator 31 of a video camera using this battery pack 4 that is being charged, there may be used numerals, e.g. time indication such as 229 min shown in FIG. 3.

An example of the manner in which the battery cell 20 of the battery pack 4 is charged by the charging device 1 according to the above-mentioned example will be described next with reference to a flowchart of FIG. 4.

Initially, the charging device 1 of the video camera is powered by the AC adapter 2, and the battery pack 4 which will be charged is attached to the video camera at its predetermined position. At that time, it is determined by the calculation processing microcomputer 5 whether or not the attached battery pack is a battery pack that can be charged (step S1). If the battery pack is a battery pack such as a dry cell or the like that cannot be charged, then the charging is ended.

If the attached battery pack 4 is the battery pack that can be charged, then the charging current is supplied from the charging circuit 3 of the charging device 1 to the battery cell 20 of the battery pack 4, and control goes to a step S2. In this step S2, the calculation processing microcomputer 5 in the charging device 1 receives data of a battery cell voltage V, data of a charging current I, data of a charging current cumulated amount Q and data of temperature dependence coefficients h1(T), h2(T) transmitted from the battery pack 4. Data of video camera power consumption data W also is stored in a memory provided in this calculation processing microcomputer 5.

Then, control goes to a step S3, and in this step S3, there are computed a charging capacity and a shooting possible time based on a present charging capacity.

This charging capacity can be obtained by a ratio of a charging current cumulated remaining amount S, obtained by the following equation, and a whole capacity of the battery cell 20. Incidentally, the whole capacity and temperature dependence coefficients h1(T), h2(T) are transmitted from the battery pack 4 through its communication processing means 4b.

Charging current cumulated remaining amount $$S=(Q-g(W))\times h2(T)$$

where g(W) is the discharge cumulated amount cumulated from the video camera running possible minimum voltage to the full discharge of the battery cell 20 and depends upon the power consumption W.

In this case, when the temperature dependence is not taken into consideration, this charging current cumulated remaining amount S is expressed as:

$$S=Q-g(W)$$

Charging capacity=S/whole capacity of battery cell

A video camera running possible time based on the present charging capacity of the battery cell during the charging can be obtained by multiplying the charging current cumulated remaining amount S with f(W) and the temperature coefficient h1(T) as expressed by the following equation. That is, the video camera running possible time R=S×f(W)×h(T) where f(W) is the coefficient for converting the charging current cumulated amount Q into the video camera running possible time and which depends upon the power consumption W of this video camera.

In this case, if the temperature dependence is not taken into consideration, this video camera running possible time R is expressed as:

$$R=S\times f(W)$$

Then, it is determined whether or not the charging capacity and the video camera running possible time thus calculated can be indicated (step S4). If they can be indicated, then the charging capacity and the video camera running possible time are displayed on the display device 6 of the charging device 1 as the indicators 30 and 31. The above-mentioned processing is repeated until the charging is ended.

According to the above-mentioned example, since the present charging capacity of the battery cell 20 being charged is calculated by the calculation processing microcomputer 5 of the charging device 1 and indicated on the display device 6 and the video camera running possible time of the video camera using this battery pack 4 is calculated based on the present charging capacity and indicated on the display device 6, the present charging capacity of the battery cell 20 being charged may be learned with ease, and the video camera running possible time of the video camera using the battery pack 4 may be learned with ease, thereby making the battery system become more convenient for the user.

However, in the above-mentioned charging device, when this charging device is formed independently of the electronic device such as the video camera or the like, it is necessary for the charging device to learn the power consumption of the electronic device that is driven by the battery pack 4. In order for the charging device to learn the power consumption of this electronic device, heretofore, there may be considered a method in which a signal line is used to connect this charging device and the electronic device to thereby input the power consumption of this electronic device into the charging device.

On the other hand, in the case of the electronic device such as the video camera or the like, in most cases or the like, the battery pack (discharging state) 4 which drives this electronic device and the charging device which charges this battery pack 4 are formed in many case independently of each other in order to maintain a safety or the like.

If this electronic device and the charging device are integrally formed as one body as seen in the above-mentioned example, then this charging device is difficult to have a highly value-added function such as boosting charge and custom charge for individual battery pack because a cost of a product increases and a space for mounting such charging device is limited.

Under such situation, if the electronic device and the charging device are made separately and the charging device is formed independently. in general, there are following requirements:

(1) To indicate a running possible time of an electronic device to which the battery pack is attach when the battery cell of the battery pack is charged by the charging device. Further, to correct an error of the electronic device running possible time indication in response to a future change of a power consumption of an electronic device driven by this battery pack.

(2) To correct an error of a running possible time indication during an electronic device is in use by the electronic device driven to which this battery pack is attached after the electronic device has understood the degree in which the performance of the battery pack is lowered upon charging by the single charging device.

(3) To correct an amount of a dark current flowing in the battery cell within the battery pack by the charging device or the electronic device driven by the battery pack during a time period from the end of the charging to the start of the discharging, from the end of the discharging to the start of the charging or the like.

When the charging device or the electronic device to which the battery pack is attached and driver thereby intends to meet with the above-mentioned requirements under the condition that the charging device and the electronic device are formed separately, the charging device needs to learn the situation (information) caused in the electronic device and the electronic device needs to learn the situation (information) caused in the charging device.

Heretofore, as a method of learning such situation (information) by the above-mentioned device, there may be considered a method in which this charging device and this electronic device are connected via a signal line and the situation (information) is interchanged and made common between the charging device and the electronic device.

However, according to this method, the signal line for connecting the electronic device and the charging device should be prepared additionally. At the same time, when this signal line is connected, it is unavoidable that a convenience, a portability and so on are deteriorated.

SUMMARY OF THE INVENTION

In view of the aforesaid aspect, for a charging device to obtain necessary information concerning an electronic device using a battery pack without connecting a signal line between an electronic device and a charging device, it becomes possible to provide a highly value-added function without deteriorating convenience and portability of a charging device and an electronic device.

A battery pack according to the present invention includes a battery cell, a data calculation processing means for obtaining a cumulated amount of a voltage of this battery cell, its charging and discharging currents and its currents based on the charging and discharging, a memory for storing information concerning an electronic device using the battery pack and a communication means.

Also, a battery system according to the present invention comprises the above-mentioned battery pack, an electronic device driven by the battery pack and including a communication means which communicates with the battery pack and read and write means for writing or reading predetermined information of an electronic device body in or from the memory of the battery pack, and a charging device for charging the battery cell of the battery pack and which includes a communication means for communicating with the battery pack and write and read means for writing or reading information necessary for charging, charging information indicative of charging and information relating to an electronic device using the battery pack in or from the memory of the battery pack, wherein informations necessary for data calculation processing executed by the battery pack, the electronic device and the charging device are obtained through the memory of the battery pack.

According to the present invention, since the informations necessary for the data calculation processing executed in the battery pack, the electronic device and the charging device are obtained through the memory of the battery pack, necessary information may be obtained without connecting the electronic device and the charging device via the signal line, and a highly value-added function may be provided without deteriorating the convenience and the portability of the charging device and the electronic device.

DESCRIPTION OF THE PREFERRED EMBODIMENTS

Figure 1:
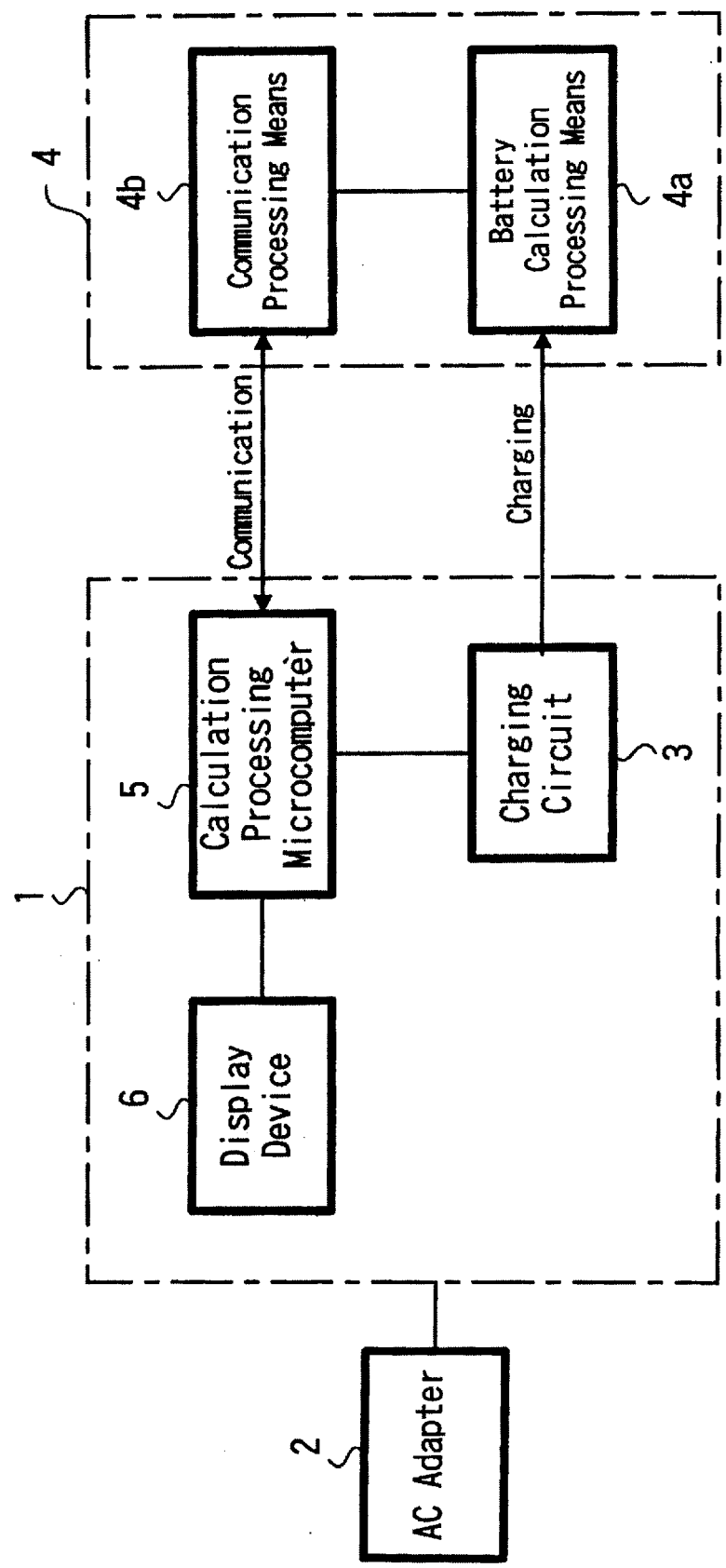
FIG. 1 is a block diagram showing an example of a batter system.
Figure 2:
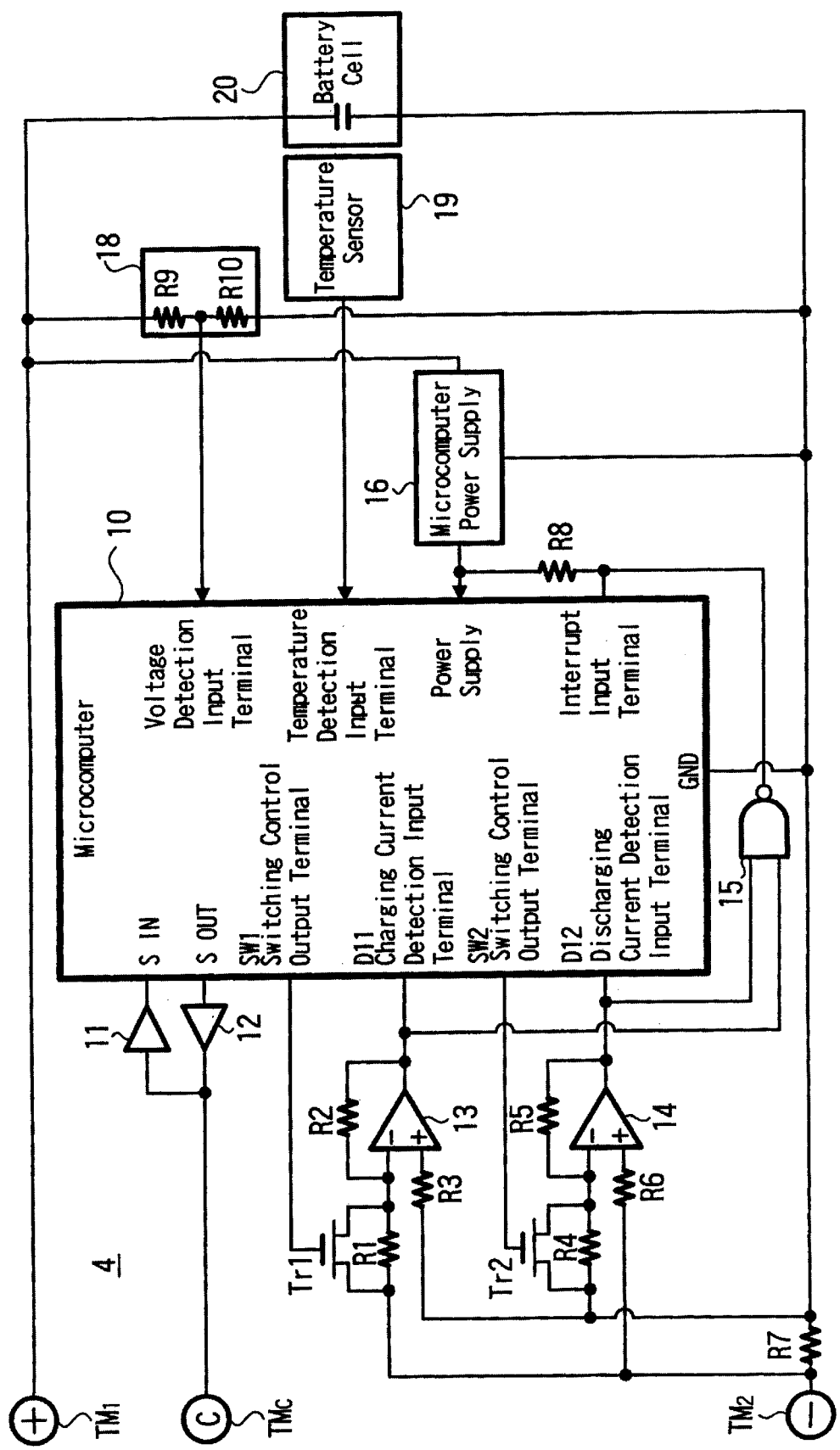
FIG. 2 is a block diagram showing an example of a battery pack.

A battery pack and a battery system according to an embodiment of the present invention will hereinafter be described with reference to FIGS. 5 to 10.

In FIGS. 5 to 10, reference numeral 40 designates a battery pack according to this embodiment. This battery pack 40 comprises a battery cell 41 formed of a lithium ion secondary battery, for example, a microcomputer 42 for executing a calculation processing or the like to obtain a voltage of this battery cell 41, its charging and discharging currents and a cumulated amount of currents based on charging and discharging and a memory 43 in which predetermined information is written or from which predetermined information is read out in accordance with a command from the microcomputer 42.

In this battery pack 40, a charging and discharging terminal of the battery cell 41 is connected to a charging and discharging terminal 44 of this battery pack 40, and an output and input terminal of the microcomputer 42 is connected through a communication interface 45 to a communication terminal 46 of this battery pack 40.

Figure 8:
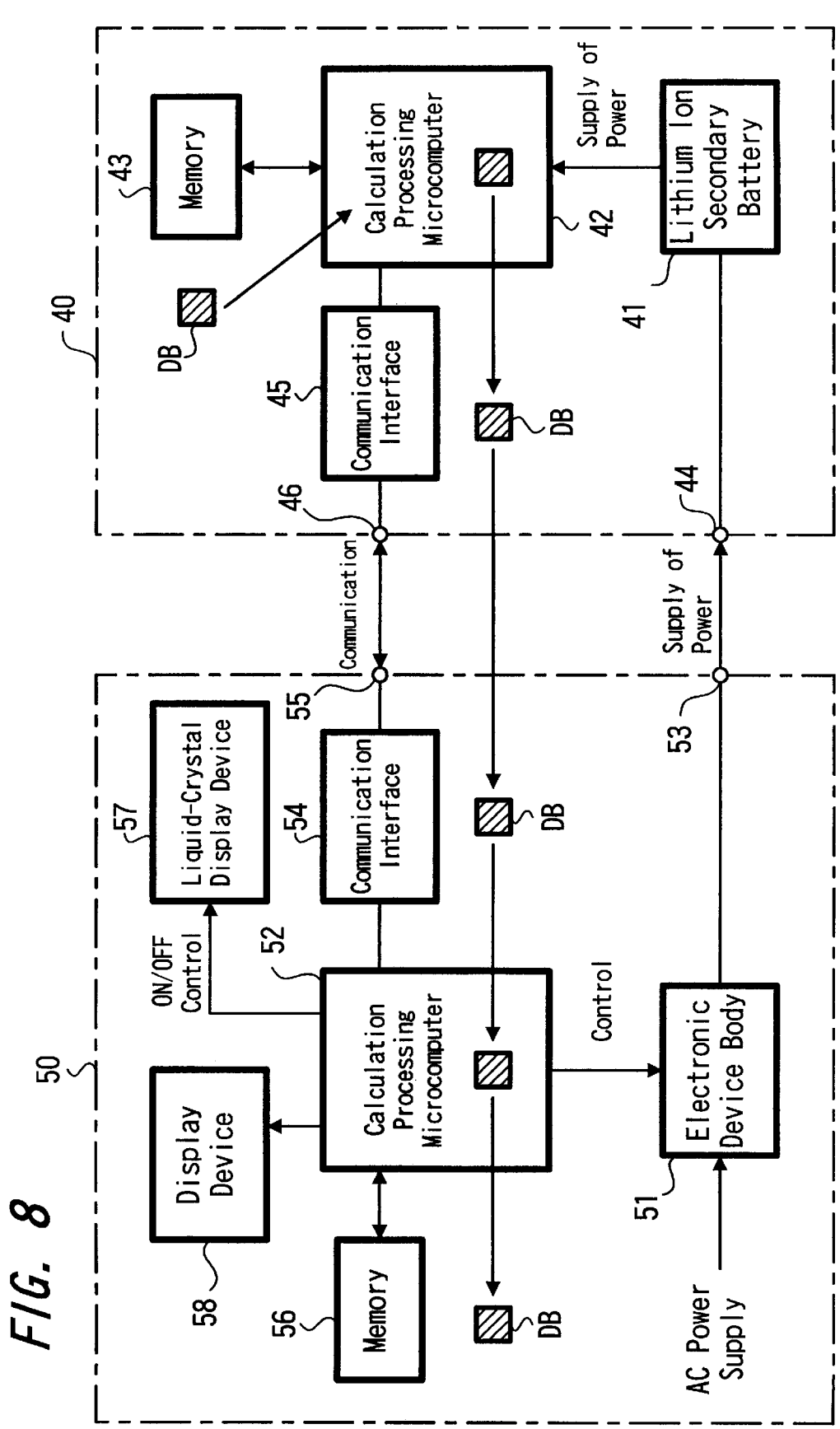
FIG. 8 is a block diagram showing a battery system according to other embodiment of the present invention.
Figure 9:
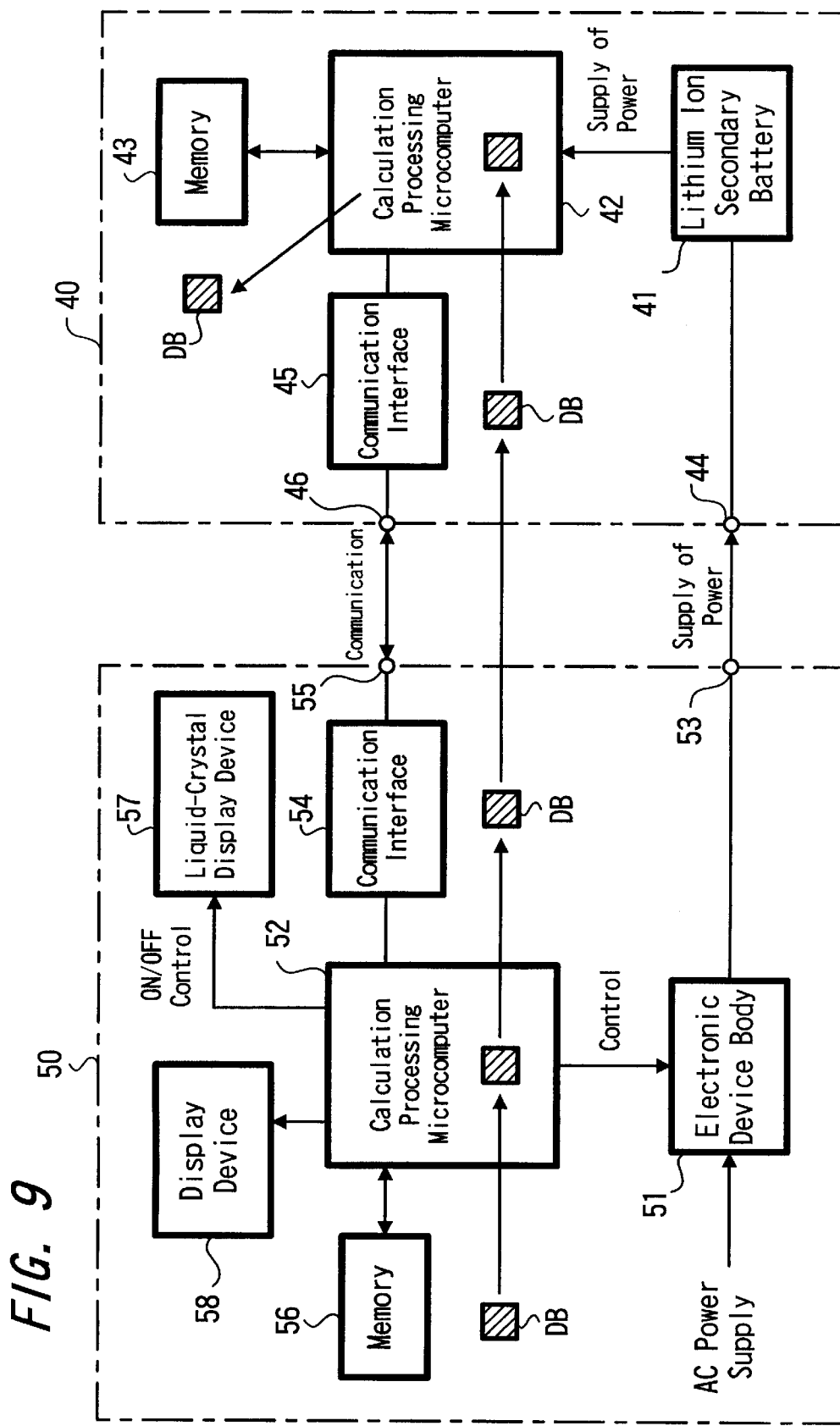
FIG. 9 is a block diagram showing a battery system according to other embodiment of the present invention.

In FIGS. 8 and 9, reference numeral 50 designates an electronic device such as a video camera or the like. In this electronic device 50, an electronic device body 51 is controlled by a microcomputer 52 which executes a calculation processing or the like. A power supply terminal of this electronic device body 51 is connected to a power supply terminal 53 of the electronic device 50 and an output and input terminal of this microcomputer 52 is connected through a communication interface 54 to a communication terminal 55 of the electronic device 50.

Also, this electronic device 50 includes a memory 56 in which predetermined information is written or from which predetermined information is read out in accordance with a command from the microcomputer 52 and a liquid-crystal display device 57 for displaying a video picture (shot picture), for example, in accordance with a command from the microcomputer 52. Further, this electronic device 50 includes a display device 58 for displaying a variety of controlled states in accordance with a command from the microcomputer 52.

Figure 6:
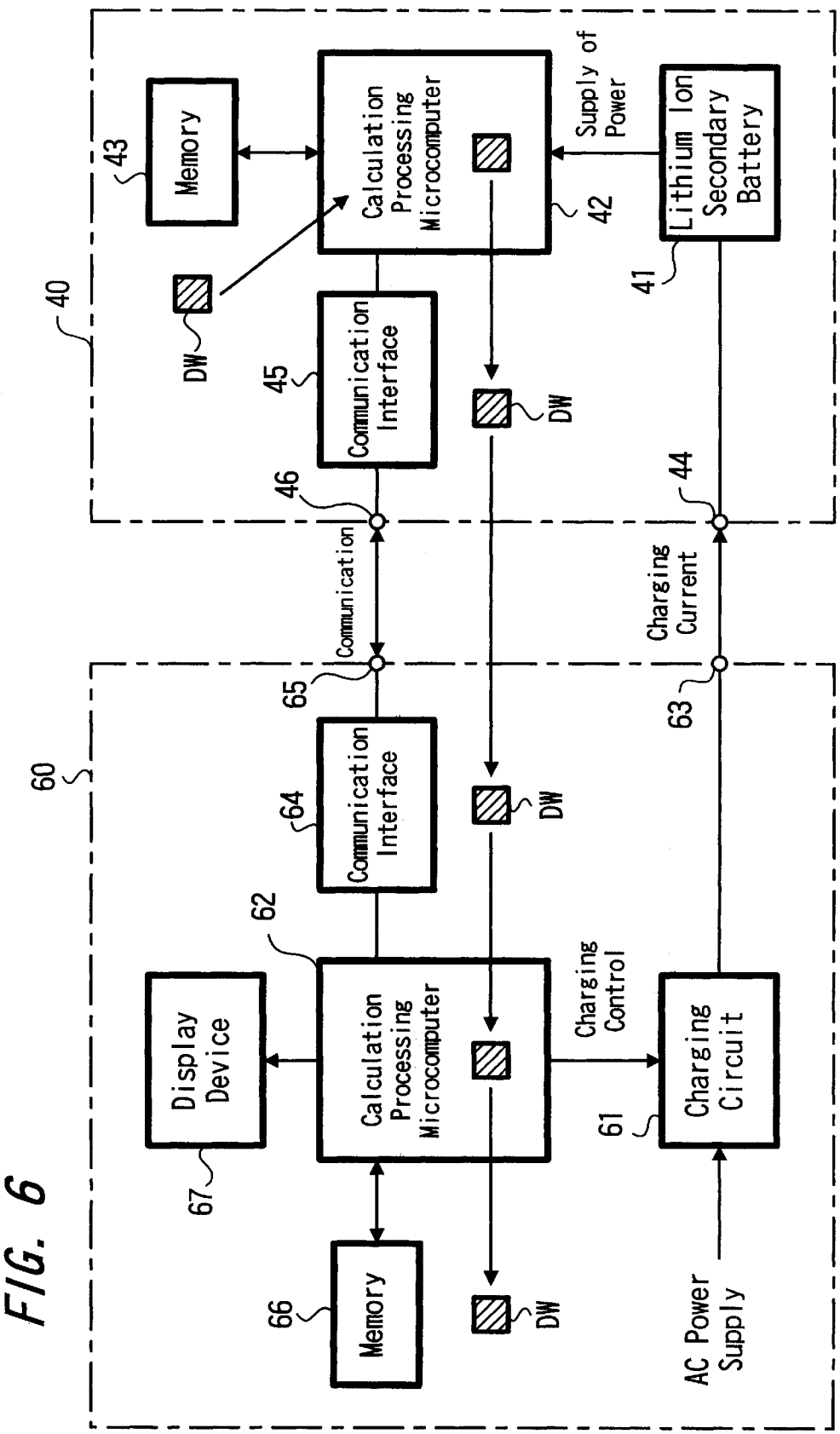
FIG. 6 is a block diagram showing a battery system according to other embodiment of the present invention.
Figure 7:
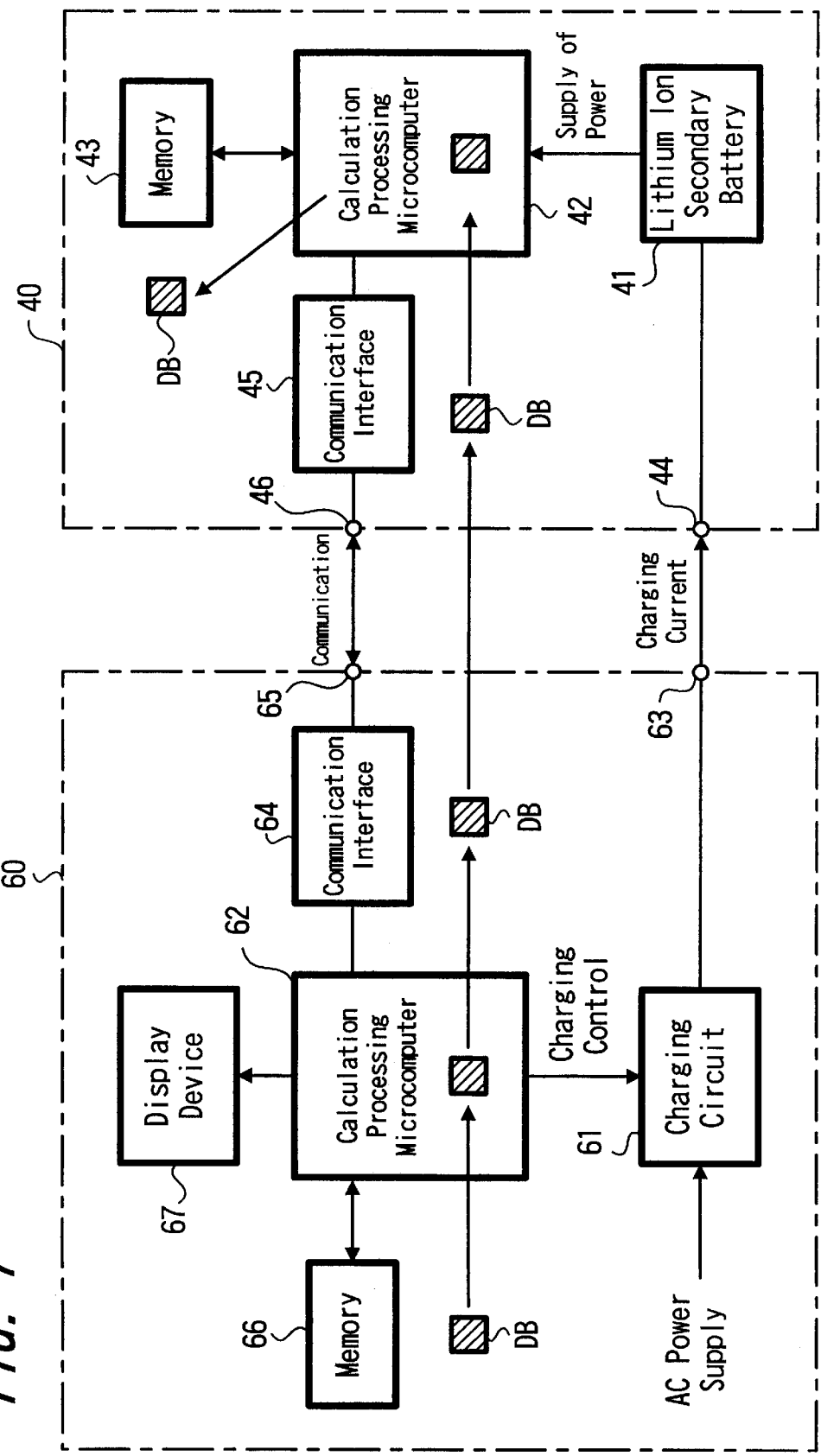
FIG. 7 is a block diagram showing a battery system according to other embodiment of the present invention.
Figure 10:
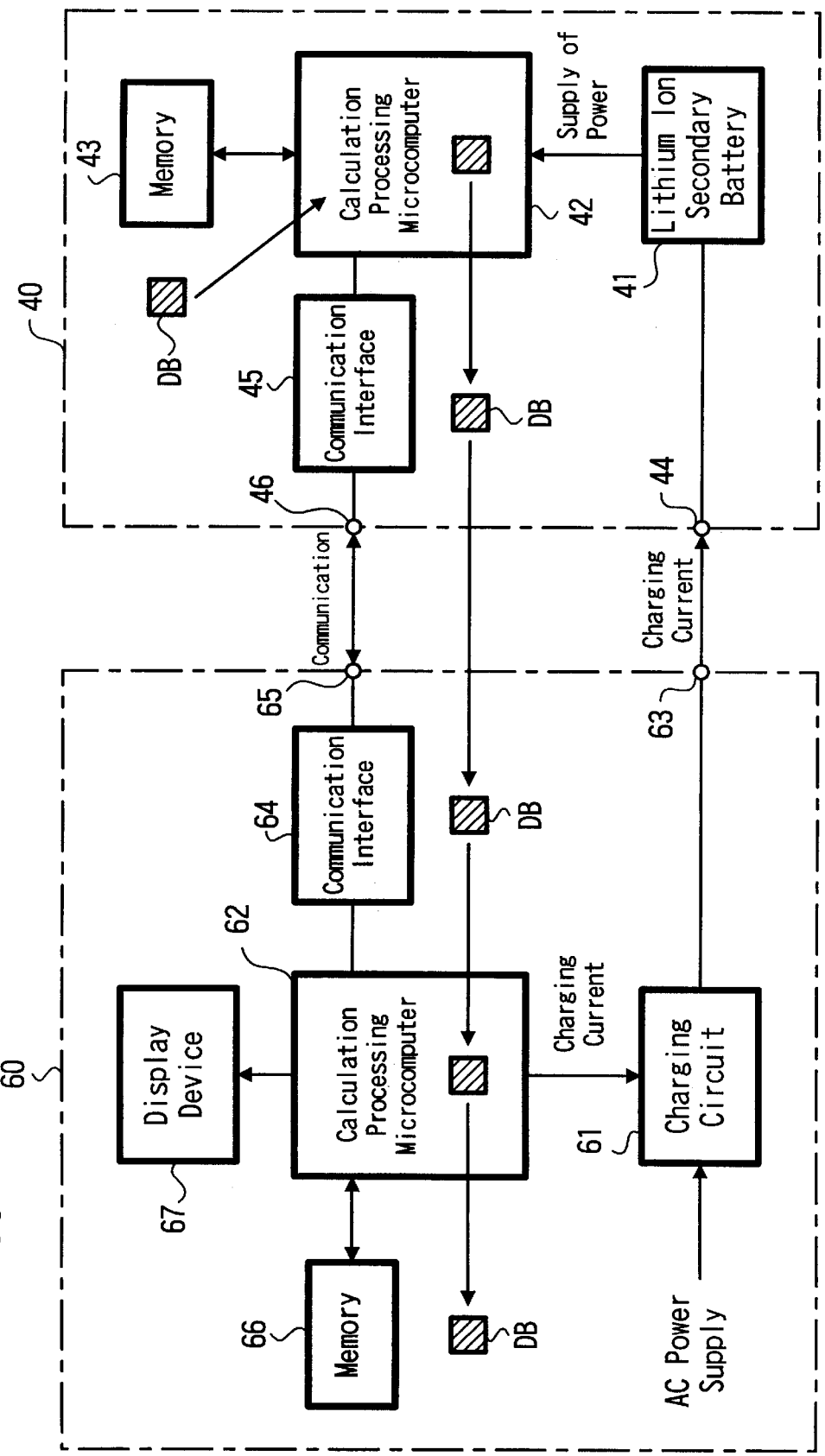
FIG. 10 is a block diagram showing a battery system according to other embodiment of the present invention.

In FIGS. 6, 7 and 10, reference numeral 60 denotes a charging device. This charging device 60 includes a charging circuit 61. This charging circuit 61 is supplied with a commercially-available power, and this charging circuit 61 is charged under control of a microcomputer 62 which executes a calculation processing or the like. A charging current obtained at the output terminal of this charging circuit 61 is supplied to a charging terminal 63 of this charging device 60.

An output and input terminal of this microcomputer 62 is connected through a communication interface 64 to a communication terminal 65 of the charging device 60. This charging device 60 includes a memory 66 in which predetermined information is written or from which predetermined information is read out in accordance with a command from the microcomputer 62.

Figure 3:
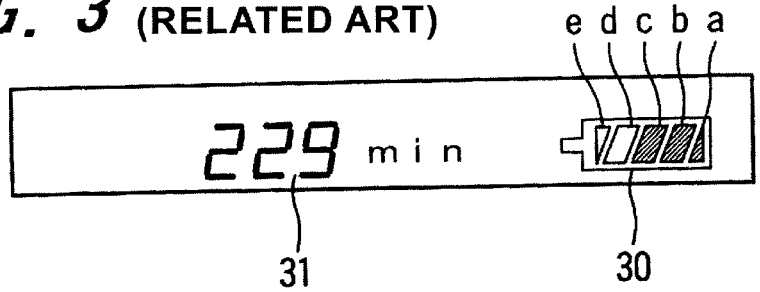
FIG. 3 is a diagram showing an example of a display.
Figure 4:
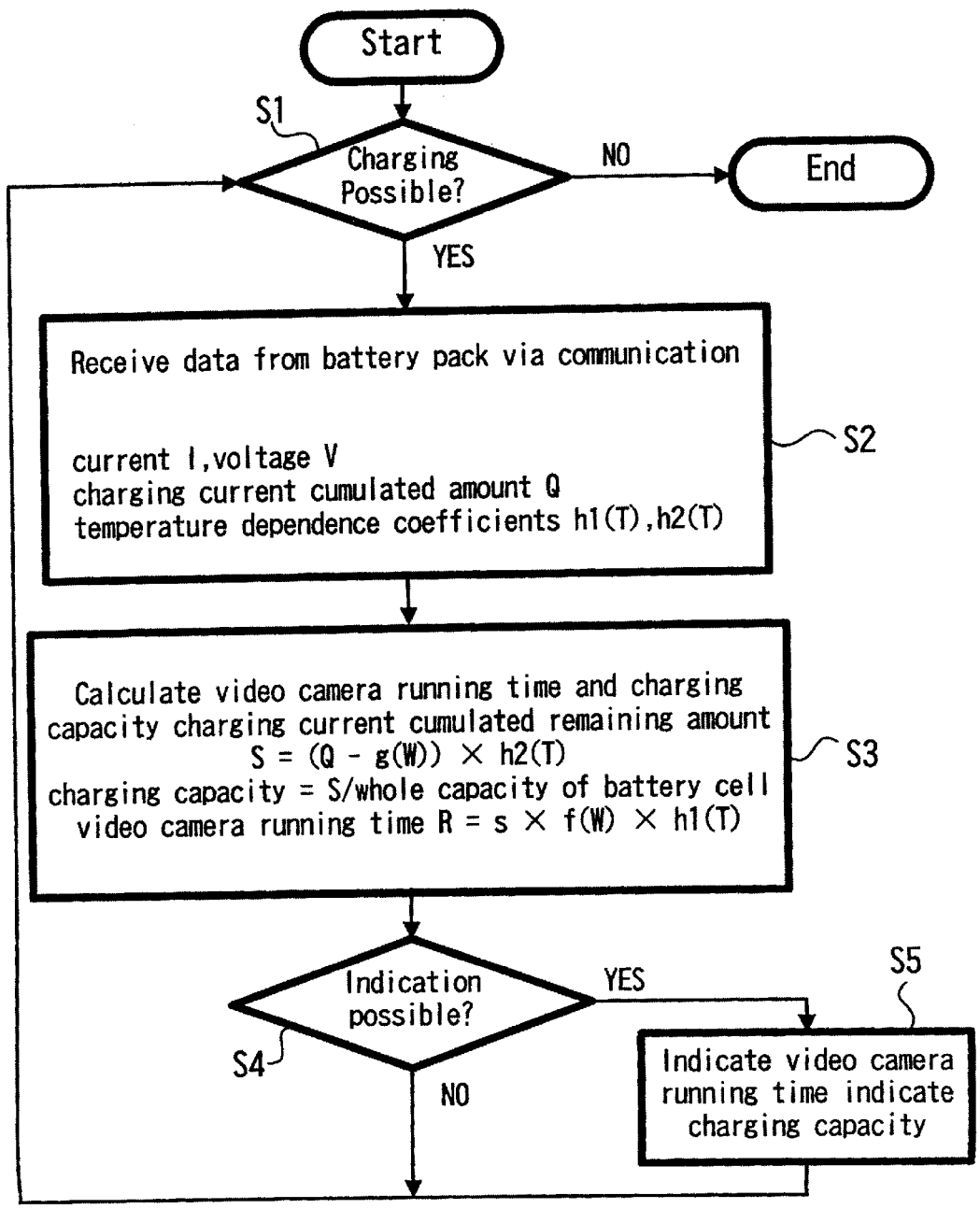
FIG. 4 is a flowchart used to explain FIG. 1.

Also, this charging device 60 includes a display device 67 shown in FIG. 3 for displaying the charged capacity of the battery cell 41 of the battery pack 40 in the charging in accordance with a command from the microcomputer 62 which executes a calculation processing or the like. This display device 67 is also able to display a time during which the electronic device 50 such as the video camera or the like using this battery pack 40 can be used by the present charged capacity.

Figure 5:
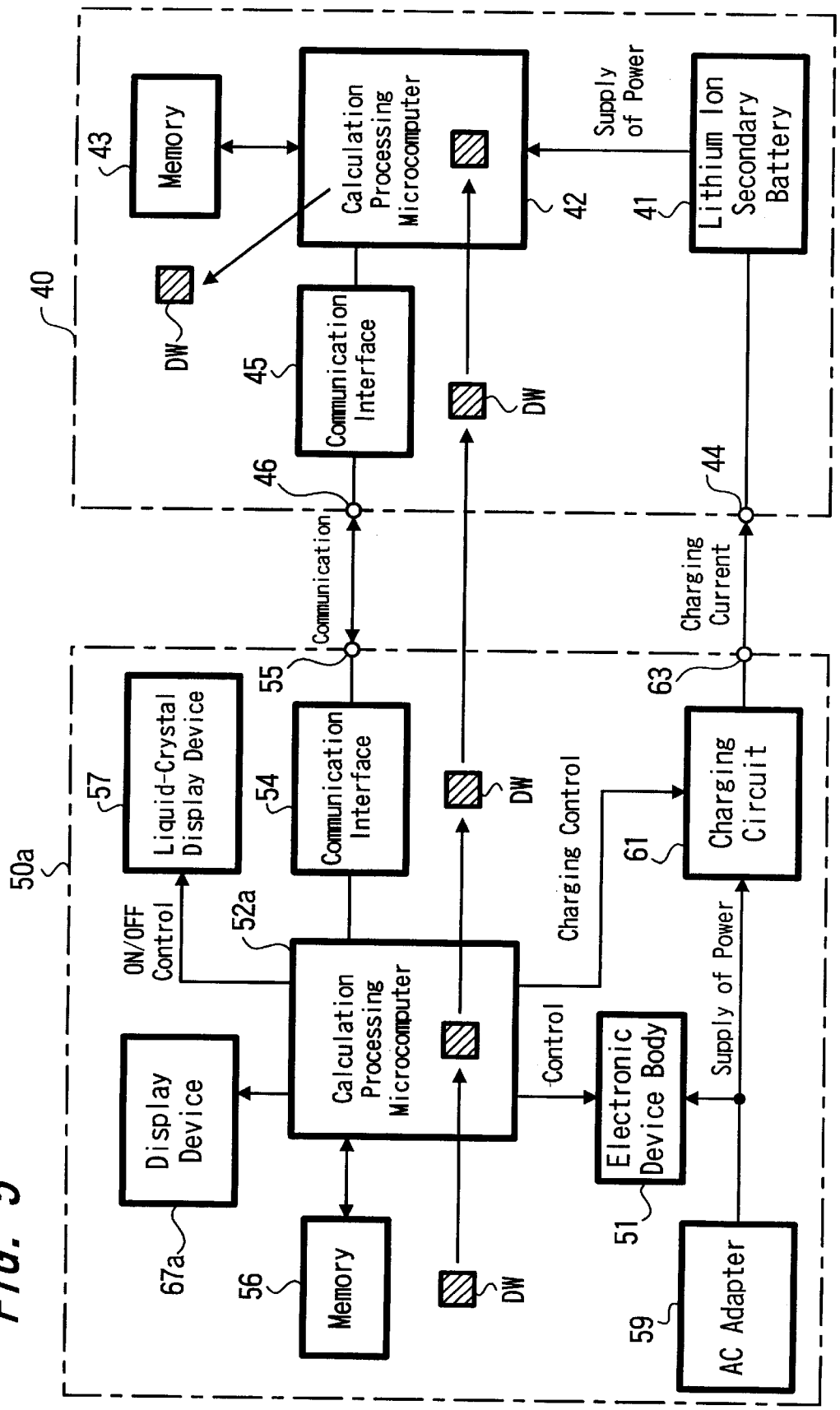
FIG. 5 is a block diagram showing a battery system according to an embodiment of the present invention.

Further, in FIG. 5, reference numeral 50a denotes an apparatus in which the charging device is assembled into the electronic device such as the video camera or the like similarly to the example shown in FIG. 1. In the apparatus 50a in which the charging device is assembled into this electronic device, a power from an Ac adapter 59, which generates a predetermined DC voltage in response to a commercially-available power, is supplied to the electronic device body 51 and the charging circuit 61. A charging current developed at the output side of this charging circuit 61 is supplied to the charging terminal 63.

Also, this apparatus 50a includes a microcomputer 52a having a function with functions of the microcomputers 52 and 62 for executing the above-mentioned calculation processing added thereto. This microcomputer 52a controls the electronic device body 51 and the charging circuit 61.

Also, this apparatus 50a includes a display device 67a. This display device 67a displays, in accordance with a command from the microcomputer 52a, the charged capacity of the battery cell 41 of the battery pack 40 in the charging and a time in which the electronic device such as the video camera or the like using this battery pack 40 can be used by the present charged capacity as shown in FIG. 3, for example. A rest of arrangement is made similar to that of the electronic device shown in FIGS. 8 and 9.

An operation of the battery system according to this embodiment will be described next.

Initially, the manner of displaying a time during which the electronic device body 51 can be driven by the charged battery pack 40 after the battery cell 41 of the battery pack 40 was charged by the apparatus 50a in which the charging device is assembled into the electronic device such as the video camera or the like will be described with reference to FIG. 5.

At that time, as shown in FIG. 5, the communication terminal 55 of the apparatus 50a and the communication terminal 46 of the battery pack 40 are connected together thereby to communicate with each other via data. At the same time, the charging terminal 63 of this apparatus 50a is connected to the charging and discharging terminal 44 of the battery pack 40, and the charging current from the charging circuit 61 is supplied to the battery cell 41 of the battery pack 40, thereby resulting in this battery cell 41 being charged.

In this case, data of a battery voltage V of the battery cell 41, a charging current I, a charging current cumulated value Q and temperature dependence coefficients h1(T), h2(T) are transmitted from the battery pack 40 to this apparatus 50a via communication. The microcomputer 52a of this apparatus 50a calculates the running possible time of this electronic device body 51 from these data values in accordance with the following equations:

Charging current cumulated remaining amount $$S=(Q-g(W))\times h2(T)$$

Running possible time $R=S\times f(W\times h1(T)$

If the power consumption W of this electronic device body 51 is stored in the memory 56 or this power consumption is calculated by the microcomputer 52a, then it is possible to calculate a time period during which the electronic device body 51 can be driven by the battery cell 41 of the battery pack 40 in charging. The time thus calculated is supplied to the display device 67a, and the display device 67a displays this running possible time.

When the charging device 60 is formed independently of the electronic device 50 such as the video camera or the like as shown in FIG. 6, in this case, the charging device 60 is provided as the single unit and is therefore unable to learn the power consumption w of this electronic device 50.

Accordingly, as shown in FIG. 5 when the battery pack 40 is connected to the apparatus 50a, this apparatus 50a transmits data DW of the power consumption W of the electronic device body 51 to the battery pack 40 via communication, and the battery pack 40 stores the transmitted data DW of the power consumption W of the electronic device body 51 in the memory 43 of this battery pack 40.

The manner of displaying a time period during which the electronic device 50 can be driven by the battery cell 41 of the battery pack 40 which is being charged by the independent charging device 60 will be described next with reference to FIG. 6. At that time, as shown in FIG. 6, the communication terminal 65 of the charging device 60 and the communication terminal 46 of the battery pack 40 are connected together thereby to effect a data communication. At the same time, the charging terminal 63 of this charging apparatus 60 is connected to the charging and discharging terminal 44 of the battery pack 40 to thereby supply the charging current from the charging circuit 61 to the battery cell 41 of the battery pack 40. Thus, the battery cell 41 is charged.

In this case, the data DW of the power consumption W of the electronic device 50 stored (memorized) in the memory 43 of the battery pack 40 is transmitted to the charging device 60 via communication, and this data DW is memorized in the memory 66. The microcomputer 62 in the charging device 60 uses the data DW of the power consumption W of the electronic device 50 stored in this memory 66 to calculate the time period during which the electronic device using the battery pack 40 that is being charged can be driven according to the above equation. The calculated result is displayed on the display device 67.

That is, in this case, the microcomputer 62 of the charging device 60 is able to obtain the data DW of the power consumption W of the electronic device 50 necessary for the calculation processing from the memory 43 of the battery pack 40 that is to be charged and hence, a signal line is not required between the electronic device 50 and the charging device 60.

If the power consumption W of the electronic device 50 is constantly made constant, then the coefficient f(W) dependent upon the power consumption W is constant. However, if this power consumption W is changed, then this coefficient f(W) also is changed. For example, this coefficient is changed not only when the liquid-crystal display device 57 for displaying a video picture is turned on/off but also when the kind and the type of the electronic device such as the video camera or the like are changed.

It is impossible for the charging device 60 to cope with a future change of such coefficient f(W) (coefficient f(W) contains end voltage correction values separately set in the battery cell 41 in response to the increase and decrease of the power consumption of the electronic device such as the video camera or the like). That is, if only one kind of this coefficient f(W) had been stored (memorized) in the charging device 60, the charging device would not cope with the future change of the power consumption of this electronic device 50. As a result, there occurs an error in the display of this running possible time.

Accordingly, in this embodiment, each time the apparatus 50a is connected to the battery pack 40 as shown in FIG. 5, for example, data of the coefficient f(W) corresponding to the change of the power consumption W as well as the data DW of the changed power consumption W of the electronic device body 51 of this apparatus 50a are transmitted to the memory 43 of the battery pack 40 and thereby memorized (stored) therein.

Thus, since the charging device 60 may use the coefficient f(W) stored in the battery pack 40 also and may cope with the future change of the electronic device, it may reduce the occurrence of the error in the display of the running possible time.

In this case, the data DW of the power consumption W and the data of the coefficient f(W) stored (memorized) in the memory 43 of the battery pack 40 may be updated not only once but also a plurality of times and stored (memorized) when the battery pack 40 is connected to the device.

Also, it is generally known that the charging and discharging capacity of the battery cell 41 of the battery pack 40 is lowered in performance by the number of charging and discharging in the battery cell 41, years in which the battery cell has been in use, a temperature of a circumstance in which the battery cell is in use or the like (battery life).

Initially, a method of confirming a battery life upon charging will be described. As a method of confirming the life of the battery cell 41 of the battery pack 40, it is possible to confirm the lift of the battery cell by comparing a charging current cumulated value Q obtained after a certain charging time elapsed and an initial value (charging current cumulated value that should be originally set after a certain charging time elapsed).

That is, if the charging current cumulated value Q is lower than the initial value, then this means that the charging and discharging capacity of the battery cell 41 is lowered. Accordingly, assuming that Qc is a value which results from subtracting the charging current cumulated value Q from the initial value, then the life of the battery cell 41 may be confirmed by the following equation:

$$\text{Battery life level value } B = Qc \times X$$

where X is the battery life coefficient.

In order for the electronic device 50 to learn this battery life level value B, it is necessary to connect the charging device 60 and the electronic device 50 by a signal line as mentioned before. According to this embodiment, as shown in FIG. 7, when the battery cell 41 of the battery pack 40 is charged by the charging device 60, data DB of this battery life level value B is transmitted to the battery pack 40 via communication, and stored (written) in the memory 43 of this battery pack 40.

In this case, when the battery cell 41 of the battery pack 40 is charged by the charging device 60, as shown in FIG. 7, the charging terminal 63 of the charging device 60 is connected to the charging and discharging terminal 44 of the battery pack 40 and the communication terminal 65 of the charging device 60 and the communication terminal 46 of the battery pack 40 are connected with each other.

Also, when the electronic device 50 is driven by this battery pack 40, as shown in FIG. 8, the electronic device 50 reads out the data DB of the battery life level B from the memory 43 of the battery pack 40 and receives the same via communication. That is, the electronic device 50 is able to learn the battery life level value B through the memory 43 of this battery pack 40 without being connected to the charging device 60 via the signal line.

In this case, when the electronic device 50 is driven by the battery pack 40, the charging and discharging terminal 44 of the battery pack 40 is connected to the power supply terminal 53 of the electronic device 50 and, at the same time, the communication terminal 55 of the electronic device 50 and the communication terminal 46 of the battery pack 40 are connected with each other.

A method of confirming the battery life by the electronic device 50 will be described next.

When the battery pack 40 is connected to the electronic device 50 in use as shown in FIG. 9 (FIG. 8), the charging current cumulated value (discharging current cumulated value) Q decreases in response to the discharging current, thereby making the discharging become possible until the charging current cumulated value Q reaches 0.

However, it is frequently observed that, as the performance of the battery cell 41 is lowered, the battery cell voltage V reaches the battery end voltage of the electronic device 50 before the charging current cumulated value Q reaches 0, thereby resulting in the electronic device 50 being stopped in use.

Accordingly, assuming that QD is a remaining amount of the charging current cumulated amount Q at the battery end voltage, then the battery life level value B may be confirmed by the above-mentioned equation:

$$B = QD \times X$$

Although the charging device 60 and the electronic device 50 should be connected by the signal line so that the charging device 60 may learn the battery life level value B as mentioned before, according to this embodiment, as shown in FIG. 9, when the electronic device 50 is driven by the battery pack 40, the data DB of this battery life level value B is transmitted to the battery pack 40 via communication, and thereby stored in the memory 43 of this battery pack 40.

Next, as shown in FIG. 10 (FIG. 7), when the battery cell 41 of the battery pack 40 is charged by the charging device 60, the data DB of the battery life level value B stored in the memory 43 of this battery pack 40 is read out and received via communication. That is, the charging device 60 is able to learn the battery life level value B through the memory 43 of this battery pack 40 without being connected to the electronic device 50 by the signal line.

As described above, when the charging corresponding to the battery life level value B, e.g. the performance of the battery cell 41 of the battery pack 40 is lowered, the charging device 60 intends to extend the life of the battery cell 41 by decreasing the charging current.

In this case, the data DB of the battery life level value B stored in the memory 43 of the battery pack 40 may be updated each time the battery cell is charged.

While the battery life level value B is used when the battery cell is charged and is used in the electronic device 50 as described above, battery life level values may be independently calculated when the battery cell is charged and is used in the electronic device 50. It is possible to calculate a more accurate value by a proper method such as comparing battery life level values obtained when the battery cell is charged and is used in the electronic device 50.

In general, the discharging and the charging are not always started immediately after the charging of the battery cell 41 of the battery pack 40 was finished or immediately after the driving of the electronic device 50 using the battery pack 40 was ended. When the charging and the discharging are not respectively started immediately after the charging of the battery cell of the battery pack was finished or immediately after the driving of the electronic device using the battery pack was ended, the discharging of the battery cell 41 of the battery pack 40 is caused to progressing by a dark current produced within this battery cell 41 and a consumed current (hereinafter referred to as a dark current) of a battery protecting circuit, thereby the charging and discharging capacity of the battery cell 41 being lowered.

Since a value of this dark current is as very small as several microamperes to several 10s of microamperes, it is very difficult to detect this dark current.

However, in order that a running possible time of the battery pack 40 relative to this electronic device 50 may be displayed correctly during the electronic device 50 is in use, it is necessary to consider (correct) an influence by this dark current.

Accordingly, in this embodiment, if the battery system is connected as shown in FIG. 7 and the battery cell 41 of the battery pack 40 is charged by the charging device 60, then when the charging is ended, data indicative of the time and date in which the charging is ended is transmitted to the battery pack 40 via communication, and the data indicative of such time and date is stored (memorized) in the memory 43 of the battery pack 40.

The electronic device 50 receives the data indicative of the time and date of the end of the charging stored in the memory 43 of this battery pack 40 via communication when the battery pack 40 is connected thereto as shown in FIG. 8, compares the received data of such time and date with the present time and date and calculates a dark current equivalent to a difference of such time and date, thereby making it possible, during using the electronic device 50, to correct an error in displaying a running possible time of the battery pack 40 relative to this electronic device 50.

Alternatively, as shown in FIG. 9, when the use of the battery pack 40 in the electronic device 50 is ended, data indicative of time and date in which the use of the battery pack is ended is transmitted to the battery pack 40 via communication and stored (memorized) in the memory 43 of the battery pack 40. Then, when the battery cell 41 of this battery pack 40 is charged by the charging device 60 as shown in FIG. 10, the charging device receives the data indicative of the time and date in which the use of this battery pack 40 is ended stored (memorized) in the memory 43 of this battery pack 40 via communication, compares the received data of such time and date with the present time and date and calculates a dark current equivalent to a difference of such time and date. Thus, the charging device is able to judge whether or not the battery cell 41 of the battery pack 40 is discharged excessively or to judge the progressing level of the excessive discharging. Therefore, the charging device 60 may charge the battery cell 41 in response to the progressing level of the excessive discharging.

In this case, because the electronic device 50 is driven by using the battery pack 40 over and over, data indicative of time and date stored in the memory 43 of the battery pack 40 should preferably be updated each time the electronic device is used.

As described above, in this embodiment, without connecting the charging device 60 and the electronic device 50 by the signal line, the charging device 60 and the electronic device 50 may store, share and exchange information (data) necessary for the memory 43 of the battery pack 40. There is then the benefit that the battery system may have a high value-added function without deteriorating the convenience and portability of the charging device 60 and the electronic device 50.

For example, during the battery cell 41 of the battery pack 40 is being charged, the battery system may cope with a future change of a power consumption of the electronic device 50 while reducing the error in displaying the running possible time of the battery cell in the electronic device 50. Therefore, when a new type of the electronic device 50, for example, is put on sale, it is not necessary for the user to purchase a new corresponding charging device 60.

Also, since it becomes possible to set a charging load and a discharging load in accordance with the life level of the battery cell 41 of the battery pack 40, the life of the battery cell 41 of the battery pack 40 may be extended more. When a lithium ion secondary battery, for example, is used as this battery cell 41, there is then the benefit that rare natural resources such as cobalt or the like may be saved.

Incidentally, it is needless to say that the present invention is not limited to the above-mentioned embodiments and that the present invention may take various modifications without departing from the gist of the present invention.

According to the present invention, without connecting the charging device and the electronic device by the signal line, the charging device and the electronic device may store, share and exchange information necessary for the memory of the battery pack. There is then the benefit that the battery system may have a high value-added function without deteriorating the convenience and portability of the charging device and the electronic device.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A battery pack charged by a charging device, comprising:

a battery cell built-in a battery pack; and a processing means for calculating a cumulated value of charging and discharging currents of said battery cell, transmitting the cumulated value of the charging and discharging currents to an outside of said battery pack and receiving information concerning a consumed power from an outside of said battery pack, wherein information concerning said current cumulated value and said consumed power is stored therein.

2. A battery system comprising the battery pack as claimed in claim 1, wherein said processing means comprises a calculation means and a memory means, said calculation means calculates a cumulated value of the charging and discharging currents of said battery cell, and said memory means stores the current calculated value and stores information concerning the consumed power which is received by said calculation means.

3. A battery system as claimed in claim 2, wherein said memory means stores as information concerning the consumed power a coefficient converting a current cumulated value by the charging into a running possible time based on the consumed power.

4. A battery system as claimed in claim 3, wherein said memory means further stores information concerning a battery life time received by said calculation means.

5. A battery system comprising the battery pack as claimed in claim 1, wherein said processing means comprises a calculation means and a memory means, said calculation means calculates the current cumulated value of a current from said battery cell to an outside of a housing, and said memory means stores the current calculated value and stores information concerning a battery life time received by said calculation means.

6. A battery system as claimed in claim 5, wherein said memory means further stores a coefficient converting a current cumulated value by the charging into a running possible time based on a consumed power.

7. A battery system formed of a battery pack and a charging device charging said battery pack, wherein said battery pack comprises a housing, a battery cell accommodated in said housing and a first processing means for obtaining a current cumulated value by charging and discharging of said battery cell, transmitting the current cumulated value to an outside of said housing and receiving information concerning a consumed power from the outside of the housing, said first processing means stores information concerning said current cumulated value and said consumed power, and said charging device comprises a display means, a charging circuit charging the battery cell of said battery pack, and a second processing means for receiving informations concerning said current cumulated value and said consumed power from said first processing means of said battery pack and calculating a running possible time, wherein a running possible time is displayed on said display means.

8. A battery system as claimed in claim 7, wherein said first processing means comprises a first calculation means and a first memory means, said first calculation means calculates the current cumulated value of a current from said battery cell to the outside of said housing, and said first memory means stores the current calculated value and stores information concerning the consumed power received by said first calculation means.

9. A battery system as claimed in claim 8, wherein said first memory means stores a coefficient converting the current cumulated value by the charging into a running possible time based on a consumed power as information concerning said consumed power.

10. A battery system as claimed in claim 8, wherein said first memory means further stores information concerning a baffer life time received by said first calculation means.

11. A battery system as claimed in claim 6, wherein said processing means comprises a first calculation means and a first memory means, said first calculation means calculates the current cumulated value of a current from said battery cell to an outside of said housing, and said first memory means stores said current calculated value and stores information concerning a battery life time received by said first calculation means.

12. A battery system as claimed in claim 11, wherein said first memory means further stores a coefficient converting a current cumulated value by the charging into a running possible time based on a consumed power.

13. A battery system comprising:

a housed battery cell;

a display means, a charging circuit for charging a battery cell built-in a battery pack; and a second processing means located outside of said battery pack for receiving information concerning a current cumulated value and a consumed power from a first processing means built-in the battery pack and calculating a running possible time, wherein a running possible time is displayed on said display means.

* * * * *